United States Patent [19]
Veenstra

[11] Patent Number: 5,436,574
[45] Date of Patent: Jul. 25, 1995

[54] UNIVERSAL LOGIC MODULE WITH ARITHMETIC CAPABILITIES

[75] Inventor: Kerry S. Veenstra, San Jose, Calif.
[73] Assignee: Altera Corporation, San Jose, Calif.
[21] Appl. No.: 153,321
[22] Filed: Nov. 12, 1993
[51] Int. Cl.⁶ .................... G06F 7/38; H03K 19/173
[52] U.S. Cl. ........................... 326/39; 326/44; 364/716; 364/768; 327/407
[58] Field of Search ............ 307/465, 465.1, 448, 307/243; 364/716, 768; 326/39, 44, 113; 327/407

[56] References Cited

U.S. PATENT DOCUMENTS

| | | | |
|---|---|---|---|
| 3,579,119 | 5/1971 | Yau et al. | 328/92 |
| 4,229,803 | 10/1980 | Rhodes | 364/787 |
| 4,541,067 | 9/1985 | Whitaker | 364/716 |
| 4,825,105 | 4/1989 | Hölzle | 307/440 |
| 4,870,302 | 9/1989 | Freeman | 307/465 |
| 4,912,339 | 3/1990 | Béchade | 307/243 |
| 5,198,705 | 3/1993 | Galbraith et al. | 307/465 |
| 5,220,213 | 6/1993 | Chan et al. | 307/465 |

OTHER PUBLICATIONS

Universal Logic Modules by Harold S. Stone, Chapter IV of Recent Developments in Switching Theory pp. 229–254, by Academic Press (1971).

Primary Examiner—Edward P. Westin
Assistant Examiner—Stephen Calogero
Attorney, Agent, or Firm—Townsend and Townsend Khourie and Crew

[57] ABSTRACT

A universal logic module for use in a programmable logic device, capable of generating all logical functions of three variables or less. The universal logic module also implements a full adder with carry propagation.

10 Claims, 3 Drawing Sheets

UNIVERSAL LOGIC MODULE WITH ARITHMETIC CAPABILITIES

BACKGROUND OF THE INVENTION

This invention relates in general to electronic circuits for generation of combinatorial logic. More particularly, this invention relates to a universal logic module for use in programmable logic devices (PLDs).

A logic cell is the fundamental building block of a PLD. Each logic cell typically includes a logic array section to implement combinatorial ("sum of the products") logic and a register to provide for sequential logic. When combined together in large numbers inside a PLD, they facilitate implementation of complex combinatorial as well as sequential logic. Therefore, versatility and cell size are among the more important considerations in design of logic cells for PLDs.

There exist differing approaches to implementing the combinatorial logic section of a PLD logic cell. One approach employs electrically programmable read only memory (EPROM) elements to implement a programmable AND array that is followed by fixed OR logic. Another method of implementing the programmable combinatorial logic uses look-up tables that can be programmed using random access memory (RAM) cells. Either method requires a number of programmable elements that must be configured for a particular logic function before input variables are applied. Furthermore, existing logic cells tend to be inflexible when implementing frequently occurring specialized functions. For example, two logic cells are required to implement a full adder with carry output using typical existing logic cells.

There is, therefore, room for improvement in methods of implementing combinatorial logic for logic cells in PLDs.

SUMMARY OF THE INVENTION

The present invention provides a small and fast universal logic module (ULM) capable of realizing all Boolean functions of three or fewer variables. The ULM of the present invention further includes a separate output that can realize the carry output of a full adder.

In a preferred embodiment, the present invention provides, in a programmable logic device, a ULM having five input terminals and an output terminal. The ULM includes two 4:1 multiplexers and 2:1 multiplexer. Each 4:1 multiplexer includes 4 data inputs, 2 select inputs and one output. The outputs of the 4:1 multiplexers feed two data inputs of the 2:1 multiplexer, whose output forms the ULM output. The eight data inputs of the two 4:1 multiplexers and their select inputs as well as the select input of the 2:1 multiplexer connect to the five input terminals and their complements. An output of one of the 4:1 multiplexers can be used as a carry output of full adder.

This embodiment of the present invention can realize all Boolean functions of three or fewer variables by assigning the three (or fewer) variables, their complements and the constants 0 and 1 to the five input terminals. Furthermore, this circuit is capable of realizing the carry output of a full adder at a secondary output without any additional circuitry. The ULM, therefore, does not require reconfiguring programmable elements to change its logic functions and is capable of implementing a full adder with carry output. Accordingly, the ULM of the present invention provides a small and versatile combinatorial circuit for use in PLDs.

A further understanding of the nature and advantages of the present invention may be gained by reference to the following detailed description and diagrams.

DESCRIPTION OF THE SPECIFIC EMBODIMENTS

A universal logic module (ULM) is a combinatorial logic circuit that can produce a set of multi-variable logic functions by only manipulating the application of variables to its several input terminals. The number of all possible unique logical functions of three variables (or less) is given by the expression [2\*\*(2\*\*3)], which is equal to [2\*\*8] or 256. It has long been known that if both true and complements of all input variables as well as the resulting output function are available, the number of nondegenerate (or canonical forms of) three-variable logic functions can be reduced to ten. That is, all Boolean functions of three variables, x, y and z, can be converted into one of ten functions f(x,y,z) by some combination of inverting the inputs, inverting the output, and permuting the inputs.

Figure 1:
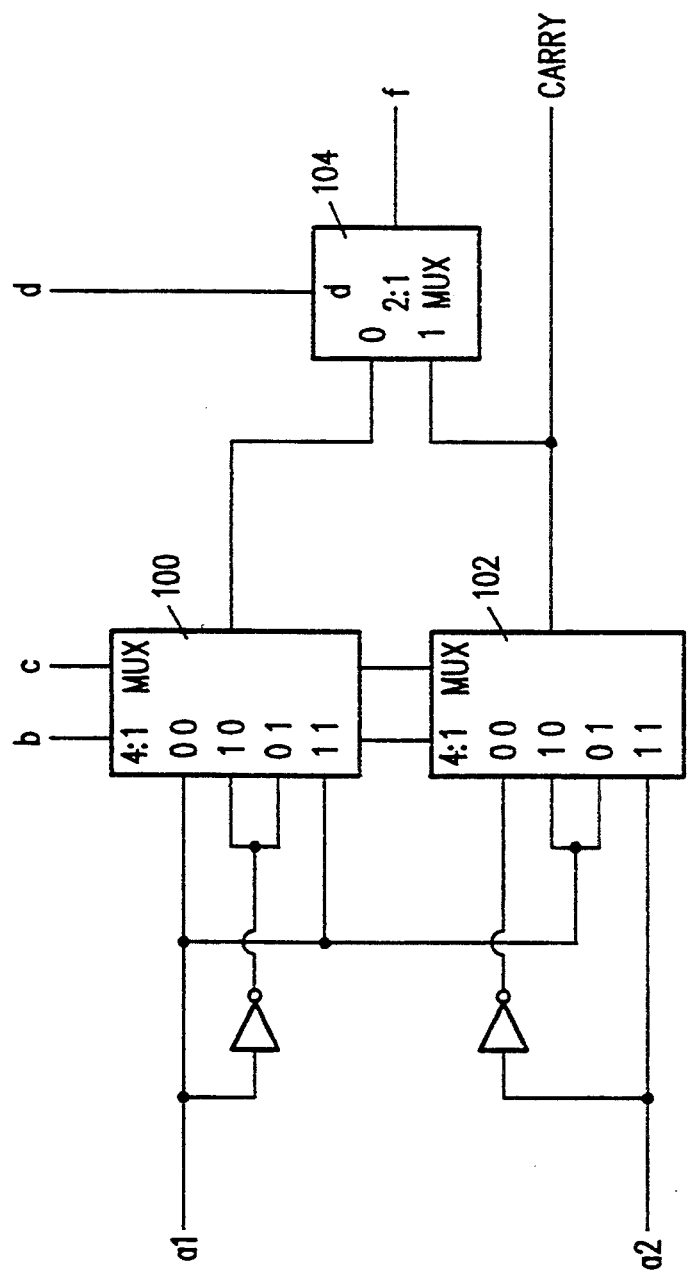
FIG. 1 is a logic diagram of the ULM of the present invention.

FIG. 1 shows a logic diagram of the three-variable ULM of the present invention. The ULM includes two 4:1 multiplexers 100 and 102, whose singular outputs feed two data inputs of a 2:1 multiplexer 104, respectively. An output of multiplexer 104 forms the output f of the ULM. Two select inputs of multiplexer 100 connect to the two select inputs of multiplexer 102 and connect to inputs b and c, respectively. The eight data inputs of the two 4:1 multiplexers 100 and 102 connect to various permutations of two inputs a1 and a2, and their complements. A select input of multiplexer 104 connects to a fifth input d. The output of multiplexer 102, carry, can realize a carry output of a full adder. The ULM, therefore, has five inputs a1, a2, b, c and d, and output f, and a carry output.

Table 1 shows one example of how the three input variables x, y and z, their complements and the constants 0 and 1 can be assigned to the five inputs of the ULM of FIG. 1, in order to realize the ten different canonical forms of three-variable functions listed in the f(x,y,z) column.

TABLE 1

|    | a1 | a2 | b  | c  | d  | f(x,y,z)            | carry(x,y,z)   |
|----|----|----|----|----|----|---------------------|----------------|
| 1  | x  | y  | x  | z  | z  | xyz                 | N.A.           |
| 2  | 0  | x  | y  | z  | 1  | xyz + x'y'z'        | N.A.           |
| 3  | 0  | x  | y' | y' | z  | (x XOR y)z          | N.A.           |
| 4  | 0  | x  | y' | z  | y' | (x + y)z            | N.A.           |
| 5  | 0  | 0  | x  | y  | z  | xy'z' + x'yz' + x'y'z | N.A.         |
| 6  | 0  | y  | 0  | x  | z  | xz' + x'y'z         | N.A.           |
| 7  | x  | 1  | y  | z  | 1  | xy + xz + yz        | N.A.           |
| 8  | x  | y  | 1  | 1  | z  | xz' + yz            | N.A.           |
| 9  | z  | z  | 1  | x' | y' | xy XOR z            | N.A.           |
| 10 | x  | 1  | y  | z  | 0  | x XOR y XOR z       | xy + xz + yz   |

Application of DeMorgan's Law allows, for example, the function $f(x,y,z)=x+y+z$ to be realized by using the first line in Table 1 that defines the function $f(x,y,z)=xyz$ and inverting all inputs and the output. The function $f(x,y,z)=xz$ XOR $y$ can be realized from the ninth function $f(x,y,z)=xy$ XOR $z$ in Table 1, by swapping $y$ and $z$. All functions of fewer than three variables can be readily realized by selecting an appropriate three-variable function from Table 1 and setting one or more of its inputs to 0 or 1. For example, the ninth function $f(x,y,z)=xy$ XOR $z$ converts to $f(x,y)=xy$ by setting $z$ to 0. Through these known methods the ULM of FIG. 1 can realize all 256 functions of three or fewer variables using the assignments shown in Table 1.

The ULM of FIG. 1 can also implement a two-input full adder with carry output. The tenth function $f(x,y,z)=x$ XOR $y$ XOR $z$ in Table 1 allows the ULM to implement a full adder by assigning, for example, $x$ and $y$ to the two inputs and $z$ to carry-in ($C_{in}$). The output multiplexer 102 in FIG. 1 generates the carry output function $xy+xz+yz$ as shown on the last line of Table 1.

Figure 2:
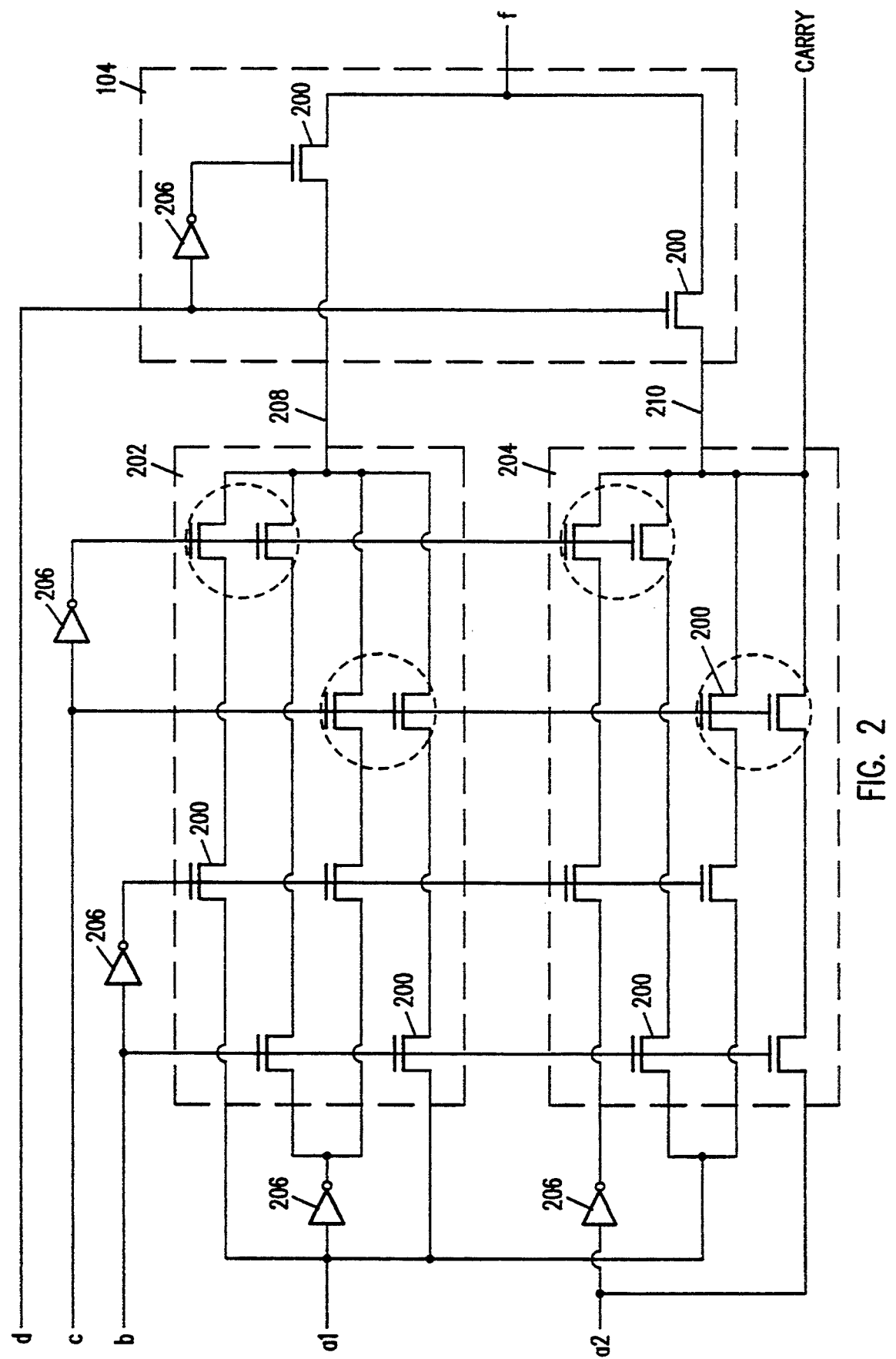
FIG. 2 is a circuit schematic showing a transistor implementation of the ULM of the present invention.

FIG. 2 shows a preferred embodiment of the circuit implementation of the ULM of FIG. 1. The 4:1 multiplexers are implemented using eight pass gates 200 arranged in four rows of two serially-connected transistors as shown in blocks 202 and 204. The gate terminals of pass gates 200 receive the select signals c and b and their complements. Two inverters 206 provide the complements of signals c and b to both multiplexer blocks 202 and 204. The four transistor rows of each block 202 and 204 receive signals a1, a2 and their complements at the input side, and connect together to form outputs 208 and 210, respectively, at the output side. The 2:1 multiplexer 104 includes two transistors 200, receiving outputs 208 and 210 at one end and connecting together at the other end to form output terminal f. The select signal d and its complement feed the gate terminals of transistors 200 of the 2:1 multiplexer 104. The output 210 of multiplexer block 204 forms the carry output. Inverters 206 generate the complements of the five input signals. It is possible to further reduce the transistor count for the circuit in FIG. 2. Because the circled pairs of transistors 200 act logically as two parallel transistors, they can be combined into a single, larger transistor, without affecting the operation of the circuit. This reduces the device count by four transistors.

The ULM of the present invention is used as the combinatorial circuit of a logic cell in a programmable logic device (PLD). The logic cell typically includes a programmable flip-flop which receives the output f at its input. The flip-flop enables the PLD to perform sequential logic. The PLD comprises a large number of logic cells that connect together through a programmable interconnect array. To drive other circuitry, the ULM outputs (f and carry) may require buffering.

One approach to implementing the carry propagation circuitry is to use an additional 2:1 multiplexer as part of the ULM and propagate carry from cell to cell without using the interconnect array. Alternatively, the carry output can feed into the programmable interconnect array before connecting to a carry input of another cell. FIG. 3A shows both these implementations in one circuit. Logic cell 300 includes a 2:1 multiplexer 302 that receives the signals c and $c_{in}$ at its input terminals. The output of multiplexer 302 connects to the terminal of the ULM that was previously connected to the c signal.

Figure 3B:
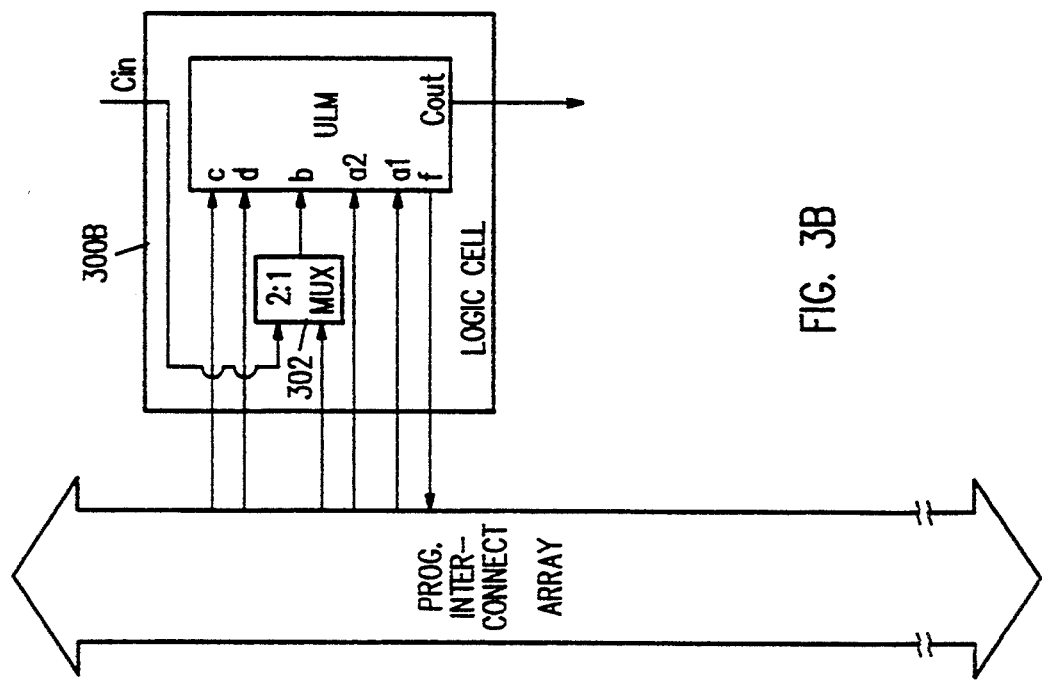
FIGS. 3A and 3B show logic cells using the ULM of the present invention implementing carry propagation circuitry.
Figure 3A:
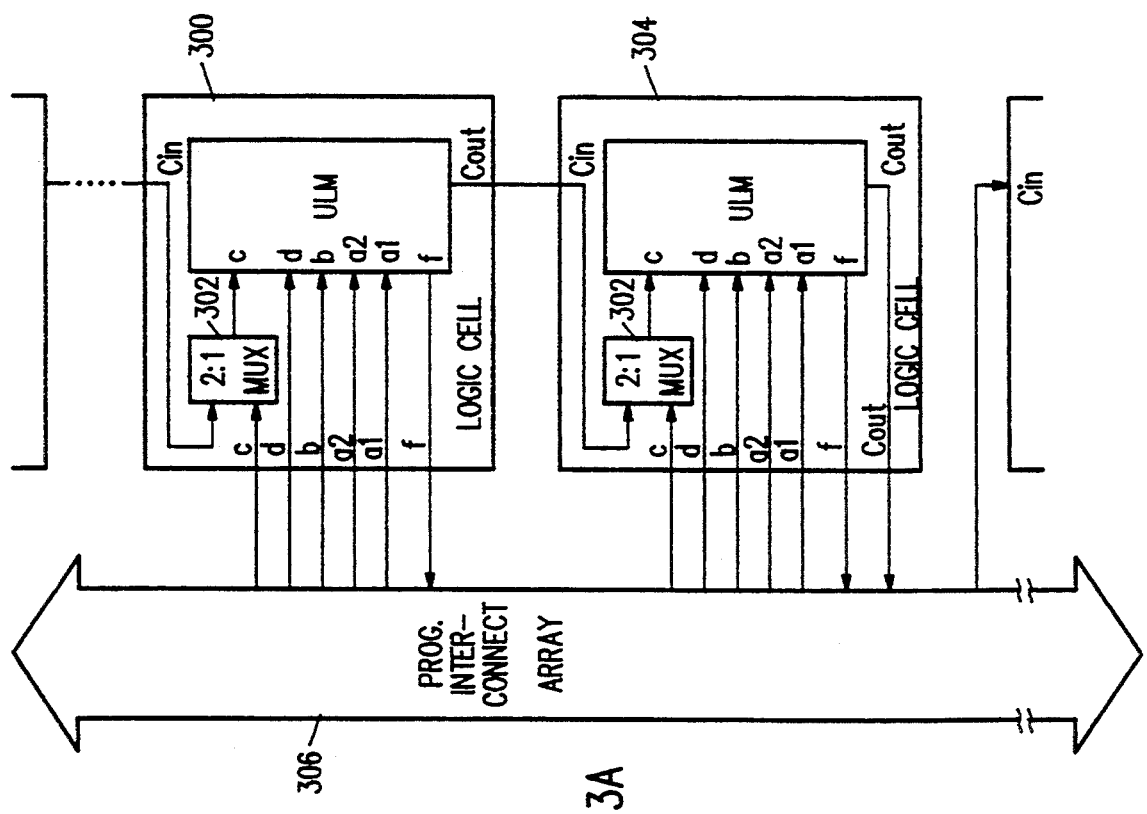

Input b can also be used as the carry input as shown in FIG. 3B), allowing the designer to select the one (i.e. either c or b) that optimizes circuit layout (e.g. the input terminal closest to the carry terminal). The select input of multiplexer 302 is controlled by a programmable architecture bit (not shown). This logic cell 300 shows carry output feeding the $c_{in}$ terminal of the next module 304 locally. The advantage of locally propagating the carry is in area savings as well as speed. Logic cell 304 is similarly constructed as logic cell 300 except for the fact that the carry output signal is not locally propagated, instead it connects to the programmable interconnect array 306. This will enable the carry output signal to connect to $c_{in}$ of any other logic cell at the cost of silicon area and speed.

In conclusion, the present invention provides a small and fast universal logic module (ULM) for use in programmable logic devices, which is capable of realizing all Boolean functions of three or fewer variables. The ULM of the present invention further includes a separate output that can realize the carry output of a full adder. While the above is a complete description of the preferred embodiments of the present invention, it is possible to use various alternatives, modifications and equivalents. For example, the ULM circuit of FIG. 2 may further provide for a programmable inversion of the output f. Therefore, the scope of the present invention should be determined not with reference to the above description but should, instead, be determined with reference to the appended claims, along with their full scope of equivalents.

What is claimed is:

1. In a programmable logic device having a programmable interconnect array, a universal logic module having five input variables and an output, comprising:

a first multiplexer having a first and a second data input coupled to a first one of the five input variables, a third and fourth data input coupled to an inverse of said first one of the five input variables, a first select input coupled to a second one of the five input variables, a second select input coupled to a third one of the five input variables, and an output;

a second multiplexer having a first and a second data input coupled to said first one of the five input variables, a third data input coupled to a fourth one of the five input variables, a fourth data input coupled to an inverse of said fourth one of the five input variables, a first select input coupled to said second one of the five input variables, a second select input coupled to said third one of the five input variables, and an output; and a third multiplexer having a first data input coupled to said output of said first multiplexer, a second data input coupled to said output of said second multiplexer, a select input coupled to a fifth one of the five input variables, and an output coupled to the output of the universal logic module.

2. The universal logic module of claim 1 further comprising a second output coupled to said output of said second multiplexer, said second output for carrying a carry output signal when the universal logic module implements an adder function.

3. The universal logic module of claim 1, wherein said first and second multiplexers are 4:1 multiplexers each comprising eight pass gates arranged in four rows of two serially-coupled pass gates.

4. The universal logic module of claim 1, wherein said third multiplexer is a 2:1 multiplexer comprising two pass gates.

5. The universal logic module of claim 2 further comprising a fourth multiplexer coupled between said third input variable and its corresponding data input, for selectively coupling one of said third input variable and a carry input signal from another universal logic module to said corresponding data input.

6. The universal logic module of claim 2 further comprising a fourth multiplexer coupled between said fourth input variable and its corresponding data input, for selectively coupling one of said fourth input variable and a carry input signal from another universal logic module to said corresponding data input.

7. The universal logic module of claim 5, wherein said fourth multiplexer is a 2:1 multiplexer comprising two pass gates.

8. The universal logic module of claim 5, wherein said carry output signal couples to a carry input of a succeeding module directly.

9. The universal logic module of claim 5, wherein said carry output signal couples to the programmable interconnect array before coupling to a carry input of another universal logic module.

10. In a programmable logic device having a programmable interconnect array, a universal logic module having five input variables, a first output and a second output, comprising:

a first 4:1 multiplexer having binary 0 and binary 3 data inputs coupled to a first one of the five input variables, binary 1 and binary 2 data inputs coupled to an inverse of said first one of the five input variables, a first select input coupled to a second one of the five input variables, a second select input coupled to a third one of the five input variables, and an output;

a second 4:1 multiplexer having binary 1 and binary 2 data inputs coupled to said first one of the five input variable, binary 0 and binary 3 data inputs coupled to a true and complement of a fourth one of the five input variables, respectively, a first select input coupled to said second one of the five input variables, a second select input coupled to said third one of the five input variables, and an output; and a 2:1 multiplexer having a first data input coupled to said output of said first multiplexer, a second data input coupled to said output of said second multiplexer, a select input coupled to a fifth one of the five input variables, and an output coupled to the first output of the universal logic module, wherein said output of said second multiplexer provides a carry output at the second output of the universal logic module when the universal logic module implements an adder function.

* * * * *